(12) United States Patent
Beck

(10) Patent No.: US 8,371,012 B2
(45) Date of Patent: Feb. 12, 2013

(54) DRILL PRESS CUTTER

(75) Inventor: Michael E. Beck, Chicago Ridge, IL (US)

(73) Assignee: Rexnord Industries, LLC, Milwaukee, WI (US)

( * ) Notice: Subject to any disclaimer, the term of this patent is extended or adjusted under 35 U.S.C. 154(b) by 336 days.

(21) Appl. No.: 12/713,711

(22) Filed: Feb. 26, 2010

(65) Prior Publication Data

US 2011/0209323 A1    Sep. 1, 2011

(51) Int. Cl.
*B23P 19/02* (2006.01)
*B23P 19/04* (2006.01)

(52) U.S. Cl. ......... 29/426.4; 29/255

(58) Field of Classification Search ......... 29/426.1, 29/426.4, 426.5, 426.6, 402.03, 402.08, 33 R, 29/898.08, 240, 255, 280, 283.5; 408/82, 408/93

See application file for complete search history.

(56) References Cited

U.S. PATENT DOCUMENTS

| | | | |
|---|---|---|---|
| 4,176,565 A | 12/1979 | Christoph | |
| 4,331,410 A | 5/1982 | Schnabel | |
| 4,625,377 A | 12/1986 | Kavthekar | |
| 4,761,868 A | 8/1988 | Allison | |
| 5,111,575 A | 5/1992 | Grunze et al. | |
| 5,213,455 A | 5/1993 | Reynolds | |
| 5,758,421 A | 6/1998 | Asada | |
| 5,842,820 A * | 12/1998 | Lee et al. | 408/204 |
| 6,182,353 B1 | 2/2001 | Grunze et al. | |
| 6,418,600 B1 | 7/2002 | Benoit | |
| 7,251,975 B2 | 8/2007 | Shih et al. | |

* cited by examiner

*Primary Examiner* — John C Hong
(74) *Attorney, Agent, or Firm* — Quarles & Brady LLP

(57) ABSTRACT

A bearing removal tool and method are provided for removing a bearing swaged in a housing with speed and ease of use without damaging the housing, where the bearing removal tool includes a locating fixture having an annular support engaging an outer race of the bearing, with the locating fixture further including a locating mandrel extending axially from a center of the annular support into a center of the bearing locating the bearing outer race relative to the annular support; a cutter head having an axially extending shank extending from one end received in a drill press chuck, with the cutter head having at least one tooth extending axially away from the shank for cutting a swaged lip of the outer race of the bearing on a side of the bearing opposite from the side of the bearing engaged by the annular support.

11 Claims, 2 Drawing Sheets

DRILL PRESS CUTTER

CROSS REFERENCE TO RELATED APPLICATIONS

Not applicable.

STATEMENT OF FEDERALLY SPONSORED RESEARCH OR DEVELOPMENT

Not applicable.

FIELD OF THE INVENTION

The present invention relates to a tool and a method for removing a bearing from a housing. More particularly, the invention relates to a tool and a method that can remove a bearing with speed and ease of use by engaging a drill press, yet preserves the integrity of the housing while doing so.

BACKGROUND PRIOR ART

A bearing is a device that allows for relative movement between two members in a constrained environment. To do so, bearings often have an annular cavity, a bore, that will allow the bearing to receive one member, which is often the rotary member. The rotary member is engaged against the interior surface of the bore. This surface composes a surface of the inner race of the bearing, which is fixed relative to the rotary member. The bearing also has an outer race, which allows for engagement with a fixed member, or a housing. Thus, the rotary member is allowed to move relative to the housing through the use of the bearing.

To fix, or stake, a bearing inside a housing, a bearing swaging tool is commonly used. A bearing swaging tool is used to place an axial force on the bearing through contact between annular movement of rollers on the swaging tool and a lip of the outer race of the bearing. The contact of the roller and the outer race of the bearing deforms the outer race to create a swaged lip. The swaged lip of the bearing is pressed flush with a chamfered edge of a housing, and the bearing is axially fixed in place within the housing. Such bearing swaging tools can be seen in the prior art, such as in U.S. Pat. No. 6,182,353.

However, while a bearing swaging tool allows a bearing to be fixed, or staked, in a housing, a different tool is commonly used to remove the bearing from the housing when the useful life of the bearing has expired. Because the swaged lip that is received in the chamfered edge of the housing is often flush, or nearly flush, with the surface of the housing, it is difficult to remove the bearing without damaging the housing. In fact, common bearing removal tools, such as bearing pullers, often engage and damage the housing when removing the bearing. The damage may be to the extent such that the housing needs replacement, adding another expense and additional time to the operation of replacing the bearing.

Some bearing removal tools are designed for use in portable situations, where the housing cannot be removed from its connecting structure and the bearing must be removed in its environment of the housing. See U.S. Pat. No. 5,213,455. Such bearing removal tools are composed of several parts that require considerable time for set-up, and must be disassembled before being used on another bearing fixed in another housing. As a result of the numerous parts, increased costs may be associated with the manufacture of such bearing removal tools. Furthermore, such portable tools are hand operated, increasing the time for actual removal of the bearing.

The prior art does not provide for a bearing removal tool or method that allows a bearing to be removed with speed and ease of use for the operator. Nor does the prior art provide for a preferred embodiment of a bearing removal tool or method that only engages the bearing, and not the housing, therefore preventing any damage to the housing. Such a tool would be useful for removing bearings where the housing can be removed from its connecting structure and taken to a separate work station, where several such items may be worked upon to remove the bearings from their respective housings.

SUMMARY OF THE INVENTION

In view of the inherent disadvantages in the known types of bearing removal tools, the present invention addresses the need to create a bearing removal tool and method for removing bearings that allows an operator to remove the bearing much faster and with more ease as compared to using other known tools or methods. Also, the present invention provides for a preferred embodiment of a bearing removal tool and method that does not engage the housing, and thus, prevents any damage to the housing.

The invention provides for a preferred embodiment of a bearing removal tool and a method for removing a bearing from a housing wherein a locating fixture, that has an annular support, engages the outer race of a bearing. The locating fixture also incorporates a locating mandrel that extends axially from the center of the annular support and protrudes into the center of the bearing, allowing the bearing outer race to be located relative to the annular support. The invention also provides for a cutter head that has a shank, which extends from one end such that it can be received in a drill press chuck, and a pilot mandrel, which extends from the cutter head in a direction opposite the shank. The cutter head also includes at least one tooth that extends axially away from the cutter head in the same direction as the pilot mandrel. The tooth on the cutter head cuts a swaged lip of the outer race of the bearing upon axial rotation and axial force provided by a drill press when the tooth engages the outer race of the bearing.

One advantage of the present invention is the speed and ease that which a bearing can be removed from a housing. Due to the use of a drill press to provide an axial and rotational force to the cutter head, and thus to the tooth or teeth on the cutter head, a swaged lip of a bearing can be cut with speed, resulting in quick removal of the bearing from its housing. Once the annular support of the locating fixture engages the outer race of the bearing and the cutter head is aligned with respect to the center of the bearing, the drill press may be used to remove the bearing from the housing. After the cutter head tooth has cut the swaged lip to a sufficient depth, backing off the cutter head with the drill press and urging the bearing from the housing is all that is required to remove the bearing. In comparison, the prior art for bearing removal tools include using hand tools to provide the axial and rotational force to cut the swaged lip on the outer race of the bearing. Thus, the invention allows an operator to remove a bearing from a housing with more speed and through less strenuous operation than does the prior art.

The speed of the present invention is further recognized when removing multiple bearings from their respective housings in succession due to the quicker set-up time of the present invention as compared to the bearing removal tools in the prior art. Such a situation occurs when several housings, with their respective bearings fixed inside, have been removed from their connecting structure and taken to a place, such as a work-shop, where the present invention may be located. Due to the invention including less overall components, the set-up time and disassembly of the invention after the first bearing is removed is shorter than the bearing removal tools in the prior art. Accordingly, an operator saves time when using the invention to remove multiple bearings in succession as compared to using the bearing removal tools in the prior art.

Yet another advantage of the invention over the prior art is that in a preferred embodiment of the invention, only the bearing is engaged when removing the bearing from the housing, and not the housing itself. Thus, no damage may occur to the housing. The prior art bearing removal tools engage the housing and this may lead to the damaging of the housing, sometimes to the extent of deformation and a need to replace the housing itself. The preferred embodiment only engages the bearing through contact with the annular support of the locating fixture and through the cutter head.

DETAILED DESCRIPTION OF THE PREFERRED EMBODIMENT

Figure 1:
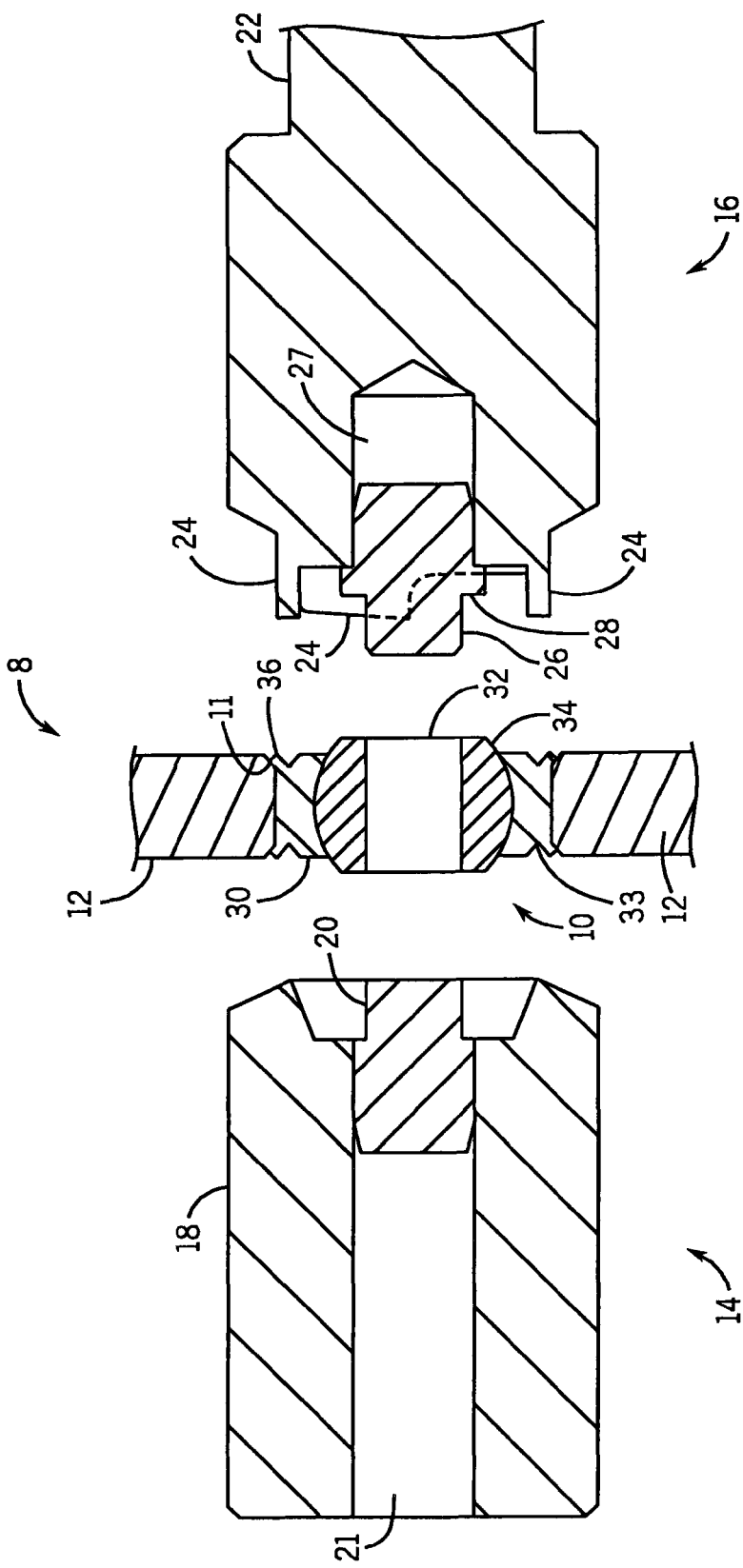
FIG. 1 is a cross-sectional view of a bearing removal tool embodying the invention, a bearing, and a bearing housing.

Referring to FIG. 1, a bearing removal tool 8 embodying the invention is illustrated, the bearing removal tool being employed to cut a bearing 10 so the bearing 10 may be removed from a bearing housing 12. The bearing has an inner race 34 and an outer race 30, as well as a bore 32, which is co-axial with the axis of the bearing 10. The bearing outer race 30 has a swaged lip 36 that is flush, or nearly flush, with a chamfered edge 11 of the bearing housing 12.

Figure 2:
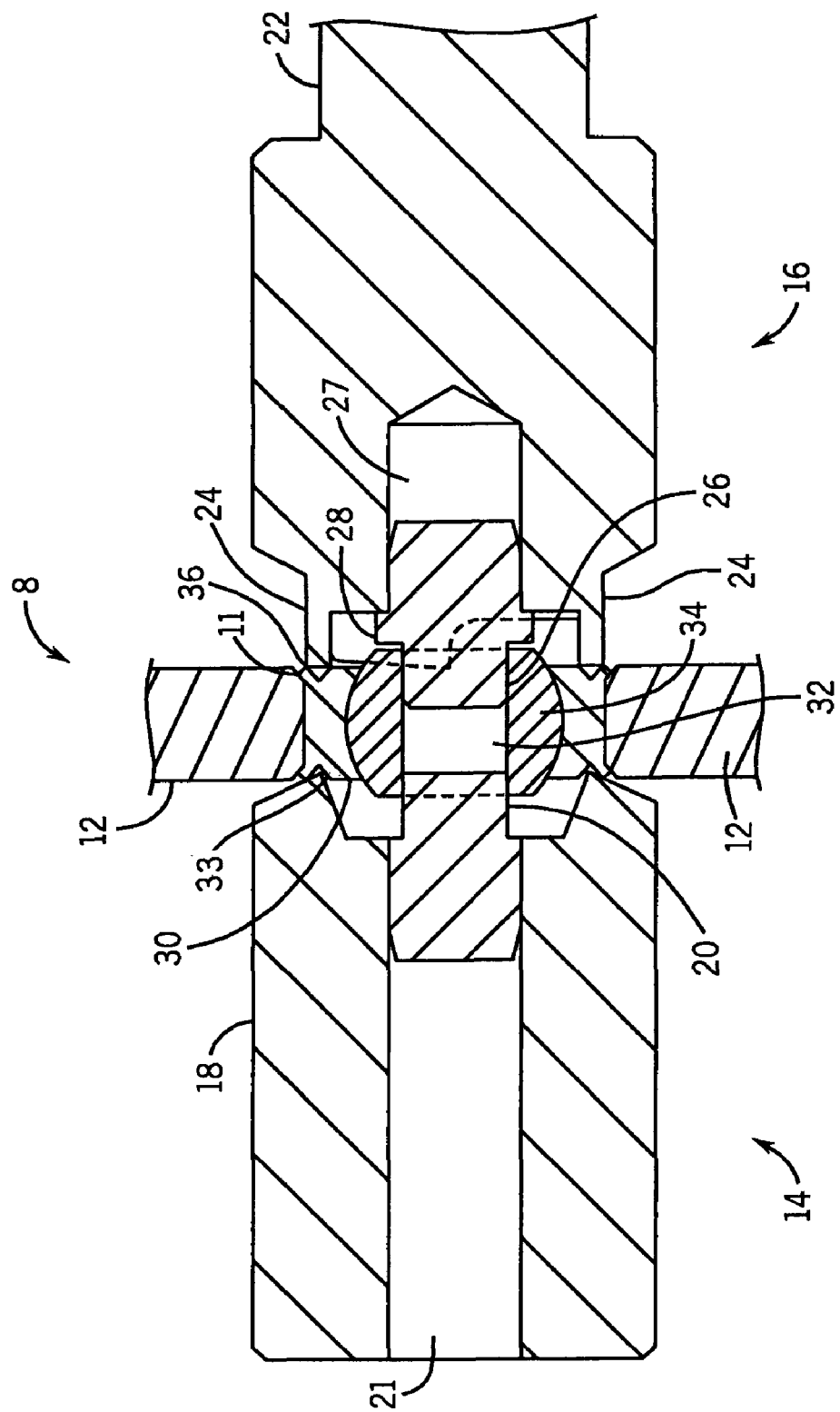
FIG. 2 is a cross-sectional view of a bearing removal tool embodying the invention, a bearing, and a bearing housing as the cutter head engages the outer race of the bearing to cut the swaged lip of the bearing outer race.

The bearing removal tool 8 is composed of two major components: a locating fixture 14 and a cutter head 16. The locating fixture 14 is composed of an annular support 18 and a locating mandrel 20. The locating mandrel 20 may be press fit within a cavity 21 in the center of the annular support 18, and the locating mandrel 20 extends axially from the locating fixture towards the bearing 10. The cutter head 16 includes a shank 22 that is received in a drill press chuck (not shown). The cutter head 16 further includes at least one tooth 24 (three are shown in FIGS. 1 and 2) that cuts the bearing 10. A pilot mandrel 26 may be press fit within a cavity 27 within the center of the cutter head 16 and extends axially away from cutter head 16. The pilot mandrel 26 includes a shoulder 28.

To cut the bearing 10, the bearing removal tool 8 must first be set-up. Set-up of the bearing removal tool 8 includes engaging the annular support 18 of the locating fixture 14 with the bearing outer race 30. The engagement between the annular support 18 and the outer race 30 may occur in an annular groove 33 located on the outer race 30 of the bearing 10. The locating mandrel 20 also helps position the bearing 10 relative to the locating fixture 14 as one end of the locating mandrel 20 is received inside the bore 32 within the bearing inner race 34.

Next, the cutter head 16 must be set-up. The shank 22 of the cutter head 16 is placed and tightened in the chuck of a drill press (not shown). The cutter head 16 may be lowered axially by the drill press to align the cutter head 16 so that the axis of the cutter head 16 is coaxial with the bore 32 of the bearing 10. This alignment may be assisted by the pilot mandrel 26 being received within the bore 32. Once aligned, the cutter head 16 may be backed off by the drill press to provide distance between the cutter head 16 and the bearing 10.

The drill press (not shown) rotatably drives the cutter head 16 and axially moves the cutter head 16 relative to the bearing 10. When the cutter head 16 is lowered by the drill press, the pilot mandrel 26 is received by the bore 32 and the teeth 24 on the cutter head 16 engage and cut the bearing outer race 30. More specifically, the teeth 24 cut the swaged lip 36 on the outer race 30 of the bearing 10. Advantageously, the cutter head 16 may be lowered by the drill press until the shoulder 28 of the pilot mandrel 26 contacts the bearing 10 to limit the cutting depth of the cutter head 16 into the bearing outer race 30. Because the outer diameter of the shoulder 28 of the pilot mandrel 26 is greater than the diameter of the inner race 34 of the bearing 10, but is less than the diameter of the outer race 30 of the bearing 10, the shoulder 28 only contacts the bearing 10, and never engages the housing 12. Consequently, the integrity of the housing 12 is always preserved. Once the shoulder 28 of the pilot mandrel 26 engages the bearing 10, the drill press may back out the cutter head 16 in a direction axial to the bearing 10 until ample clearance is provided between the cutter head 16 and the bearing 10 and housing 12.

To remove the bearing 10 from its housing 12, the locating fixture 14 is disengaged from the bearing 10 and the bearing 10 may be urged in a direction away from the cut swaged lip 36. The removal of the bearing 10 from its housing 12 is then complete and the bearing removal tool 8 is ready to perform another operation.

Advantageously, the bearing removal tool 8 described herein is less strenuous to operate and performs the removal of the bearing 10 from the housing 12 more quickly than other known bearing removal tools. Not only does the bearing removal tool 8 increase the speed and ease of use by removing the bearing 10 from the housing 12 with the use of a drill press (not shown) rather than by a hand operated tool, but the bearing removal tool 8 also provides for easier set-up and preparation so that time can be saved when removing several bearings in succession.

The bearing removal tool 8 can be manufactured for removing different size bearings, and in fact, is constructed with precision to insure the integrity of the housing is preserved during operation of the bearing removal tool 8. Such precision is important in situations where bearings are constructed with dimensions having high tolerances, as in the aerospace industry.

For example, the cutter head 16 may be constructed such that the outside diameter of the annular path that the teeth 24 travel during rotation is approximately 0.010 inches less than the outer diameter of the bearing outer race 30. This precision dimensioning insures that the teeth 24 will not engage or damage the housing 12. Furthermore, the pilot mandrel 26 is constructed with precision so that there is only a difference of approximately 0.002 to 0.004 inches between the outer diameter of the pilot mandrel 26 and the diameter of the bore 32 of the bearing 10. This precision aids in the alignment of the cutter head 16 with the bearing 10 and housing 12 and provides assurance that the cutter head 16 will not engage the housing 12 during cutting of the bearing 10. Thus, different sizes of the bearing removal tool 8 may be constructed once the dimensions for the bore 32 and the diameter of the bearing outer race 30 are known because a cutter head 16 with appropriate dimensions for the diameter of the pilot mandrel 26 and the outside diameter of the annular path that the teeth 24 travel during rotation may then be planned accordingly as described above.

In a preferred embodiment of the invention, the cutter head 16 is composed of an austenitic nickel-chromium based super-alloy, such as an INCONEL® alloy. A heat treated and hardened material is necessary for the cutter head 16 in certain applications, such as in aerospace applications, where bearings themselves are composed of hardened materials.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A bearing removal tool for removing a bearing swaged in a housing, said bearing removal tool comprising:
   a locating fixture having an annular support engaging an outer race of the bearing, said locating fixture further including a locating mandrel extending axially from a center of said annular support into a center of the bearing locating the bearing outer race relative to the annular support; and
   a cutter head having an axially extending shank extending from one end received in a drill press chuck, said cutter head including a pilot mandrel extending axially away from said shank and into the center of the bearing and having at least one tooth extending axially away from said shank for cutting a swaged lip of the outer race of the bearing on a side of the bearing opposite from the side of the bearing engaged by the annular support.

2. The bearing removal tool as set forth in claim 1, wherein the pilot mandrel has a shoulder that limits the axial depth of the cutting of the bearing by the tooth on the cutter head by having an outside diameter that is greater than the inner diameter of the bearing, but less than the outside diameter of the bearing, such that the pilot mandrel engages the bearing upon the full depth of cut, but never engages the housing.

3. The bearing removal tool as set forth in claim 1, wherein the annular support engages an annular groove in the outer race of the bearing.

4. The bearing removal tool as set forth in claim 1, wherein the outside diameter of an annular path that the tooth travels during rotation is approximately 0.010 inches less than the outer diameter of the bearing outer race, such that the housing is not engaged by the tooth during cutting.

5. The bearing removal tool as set forth in claim 1, wherein the cutter head is composed of a heat treated and hardened material.

6. A method of removing a swaged bearing from a housing, said method comprising:
   inserting a shank of a cutter head into a drill press chuck of a drill press;
   supporting said swaged bearing when cutting a swaged lip of said swaged bearing by engaging a side opposite said swaged lip with a locating fixture, supporting said bearing including inserting a locating mandrel extending from said locating fixture into a center of said swaged bearing to locate said locating fixture relative to the swaged bearing;
   aligning a tooth extending from said cutter head with the swaged lip of the swaged bearing fixed in a housing, aligning said tooth with the swaged lip including inserting a pilot mandrel extending axially from said cutter head into the center of said swaged bearing;
   engaging said tooth with said swaged lip by moving said cutter head axially toward said swaged bearing;
   rotatably driving said cutter head with said drill press to cut said swaged lip from said swaged bearing; and
   urging said swaged bearing out of said housing in a direction away from said cut swaged lip.

7. The method as in claim 6, in which supporting said bearing further includes engaging said side opposite said swaged lip with an annular support extending axially from said locating fixture.

8. The method as in claim 7, in which said annular support is received in an annular groove formed in said side opposite said swaged lip.

9. The method as in claim 6, in which said tooth engages said swaged bearing approximately 0.010 inches radially inwardly from an outer diameter of an outer race of said swaged bearing to cut said swaged lip from said swaged bearing without engaging said housing with said tooth.

10. The method as in claim 6, including limiting a cutting depth of said tooth by engaging a shoulder extending radially from said pilot mandrel with said swaged bearing to prevent further axial movement of said cutter head toward said swaged bearing.

11. The method as in claim 10, in which said shoulder has an outside diameter that is less than an outside diameter of said swaged bearing.

* * * * *